United States Patent
Karjalainen et al.

(10) Patent No.: US 12,167,254 B2
(45) Date of Patent: Dec. 10, 2024

(54) NETWORK ASSISTED DISCOVERY FOR WIRELESS COMMUNICATION

(71) Applicant: Nokia Technologies Oy, Espoo (FI)

(72) Inventors: Juha Pekka Karjalainen, Oulu (FI); Sami-Jukka Hakola, Kempele (FI); Timo Koskela, Oulu (FI); Jari Yrjana Hulkkonen, Oulu (FI); Antti Arvola, Oulu (FI); Satya Krishna Joshi, Oulu (FI); Antti Tolli, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 346 days.

(21) Appl. No.: 17/779,612

(22) PCT Filed: Mar. 13, 2020

(86) PCT No.: PCT/EP2020/057009
§ 371 (c)(1),
(2) Date: May 25, 2022

(87) PCT Pub. No.: WO2021/104680
PCT Pub. Date: Jun. 3, 2021

(65) Prior Publication Data
US 2023/0008786 A1    Jan. 12, 2023

Related U.S. Application Data

(60) Provisional application No. 62/940,495, filed on Nov. 26, 2019.

(51) Int. Cl.
*H04W 16/28* (2009.01)
*H04B 7/06* (2006.01)
(Continued)

(52) U.S. Cl.
CPC ........... *H04W 16/28* (2013.01); *H04B 7/0617* (2013.01); *H04W 8/005* (2013.01); *H04W 16/14* (2013.01); *H04W 24/10* (2013.01)

(58) Field of Classification Search
CPC ..... H04W 16/14; H04W 16/28; H04W 8/005; H04W 24/10; H04B 7/0617; H04B 7/06954
See application file for complete search history.

(56) References Cited

U.S. PATENT DOCUMENTS

2018/0262900 A1 * 9/2018 Moon ............... H04L 27/26025
2019/0053320 A1 * 2/2019 Islam ............... H04W 52/0229
(Continued)

FOREIGN PATENT DOCUMENTS

CA          3049154 A1 *  7/2018  ........... H04B 7/0408
WO  WO-2018083377 A1 *  5/2018  ............ H04W 24/02
(Continued)

OTHER PUBLICATIONS

Sim, Gek Hong (Allyson), et al., "5G Millimeter-Wave and D2D Symbiosis: 60 GHz for Proximity-Based Services", © 2017 IEEE, 6 pgs.

*Primary Examiner* — Chi H Pham
*Assistant Examiner* — Vladislav Y Agureyev
(74) *Attorney, Agent, or Firm* — Robert P. Michal, Esq.; Carter, DeLuca & Farrell LLP

(57) ABSTRACT

According to an example aspect of the present invention, there is provided a method, including receiving, from a radio access network device, a beam sweeping configuration indicative of spatial limitation in relation to a reference, and performing beam sweeping configured spatially based on the received beam sweeping configuration for extending connectivity via the network device outside coverage of the network device.

15 Claims, 6 Drawing Sheets

(51) Int. Cl.
    *H04W 8/00*     (2009.01)
    *H04W 16/14*    (2009.01)
    *H04W 24/10*    (2009.01)

(56) References Cited

U.S. PATENT DOCUMENTS

| | | | |
|---|---|---|---|
| 2019/0089499 A1* | 3/2019 | Nam | H04W 4/06 |
| 2019/0116605 A1* | 4/2019 | Luo | H04W 72/0446 |
| 2019/0230545 A1* | 7/2019 | Liou | H04W 24/10 |
| 2019/0238287 A1* | 8/2019 | Zhou | H04B 7/0626 |
| 2019/0319686 A1* | 10/2019 | Chen, IV | H04B 7/0639 |
| 2019/0387534 A1* | 12/2019 | Geraci | H04W 72/046 |
| 2020/0229126 A1* | 7/2020 | Soriaga | H04W 4/029 |
| 2021/0068123 A1* | 3/2021 | Zhu | H04B 7/0874 |
| 2021/0135734 A1* | 5/2021 | Abedini | H04B 7/063 |
| 2021/0136703 A1* | 5/2021 | Kundargi | H04W 72/23 |
| 2021/0160851 A1* | 5/2021 | Akkarakaran | H04W 76/14 |
| 2021/0204252 A1* | 7/2021 | Akkarakaran | H04W 72/02 |
| 2021/0212051 A1* | 7/2021 | Raghavan | H04B 7/088 |
| 2021/0235501 A1* | 7/2021 | Abedini | H04W 74/0833 |
| 2021/0273702 A1* | 9/2021 | Yang | H04B 7/0404 |
| 2021/0321267 A1* | 10/2021 | Kim | H04B 7/0408 |
| 2021/0360429 A1* | 11/2021 | Reial | H04W 8/24 |
| 2022/0286867 A1* | 9/2022 | Siomina | H04W 16/28 |

FOREIGN PATENT DOCUMENTS

| | | | | |
|---|---|---|---|---|
| WO | WO-2018141981 A1 * | 8/2018 | | H04B 7/0408 |
| WO | WO-2018143875 A1 * | 8/2018 | | |
| WO | WO-2018143995 A1 * | 8/2018 | | |
| WO | WO-2020259838 A1 * | 12/2020 | | |

* cited by examiner

NETWORK ASSISTED DISCOVERY FOR WIRELESS COMMUNICATION

CROSS REFERENCE TO RELATED APPLICATION

This patent application is a U.S. National Stage application of International Patent Application Number PCT/EP2020/057009 filed Mar. 13, 2020, which is hereby incorporated by reference in its entirety, and claims priority to U.S. provisional application 62/940,495 filed Nov. 26, 2019, which is hereby incorporated by reference in its entirety.

FIELD

Various example embodiments relate to wireless communications, and in particular to network assisted discovery for wireless communication.

BACKGROUND

Upcoming mobile communication systems should fulfill a wide range of technical requirements to cope with the explosive growth of mobile data traffic, massive number of connected devices, emergence of new services and need for increased data transmission speed. Network densification using millimeter-wave (mmWave) communications, combined with massive multiple-input multiple-output (MIMO) and beamforming techniques, provides a framework to achieve throughputs in the range of Gbps. However, the capital and operational expenditures increase as the base station (BS) density increases. A cost-effective radio access network (RAN) solution is thus of great interest, which may involve extending connectivity via a base station beyond cell coverage of the base station.

SUMMARY

Some aspects of the invention are defined by the features of the independent claims. Some specific embodiments are defined in the dependent claims.

According to a first aspect of the present invention, there is provided a method for a first device, comprising: receiving, from a radio access network device, a beam sweeping configuration indicative of spatial limitation in relation to a reference, and performing beam sweeping configured spatially based on the received beam sweeping configuration for extending connectivity via the network device outside coverage of the network device.

According to a second aspect of the present invention, there is provided a method for a radio access network device, comprising: defining a beam sweeping configuration for a first device indicative of spatial limitation for beam sweeping on the basis of position information of the first device and a reference, and transmitting the beam sweeping configuration to the first device for configuring beam sweeping spatially for extending connectivity via the network device outside coverage of the network device.

There is also provided an apparatus comprising at least one processor, at least one memory including computer program code, the at least one memory and the computer program code being configured to, with the at least one processor, cause the apparatus at least to carry out features in accordance with the first and/or second aspect, or any embodiment thereof.

There is further provided an apparatus, comprising means configured for causing the apparatus at least to carry out features in accordance with the first and/or second aspect, or any embodiment thereof. The means may comprise at least one processor, and at least one memory including computer program code, the at least one memory and the computer program code being configured to, with the at least one processor, cause the performance of the apparatus.

According to still further aspects, there are provided a computer program and a computer-readable medium, or a non-transitory computer-readable medium, configured, when executed in a data processing apparatus, to perform features in accordance with the first and/or second aspect, or an embodiment thereof.

EMBODIMENTS

Figure 1:
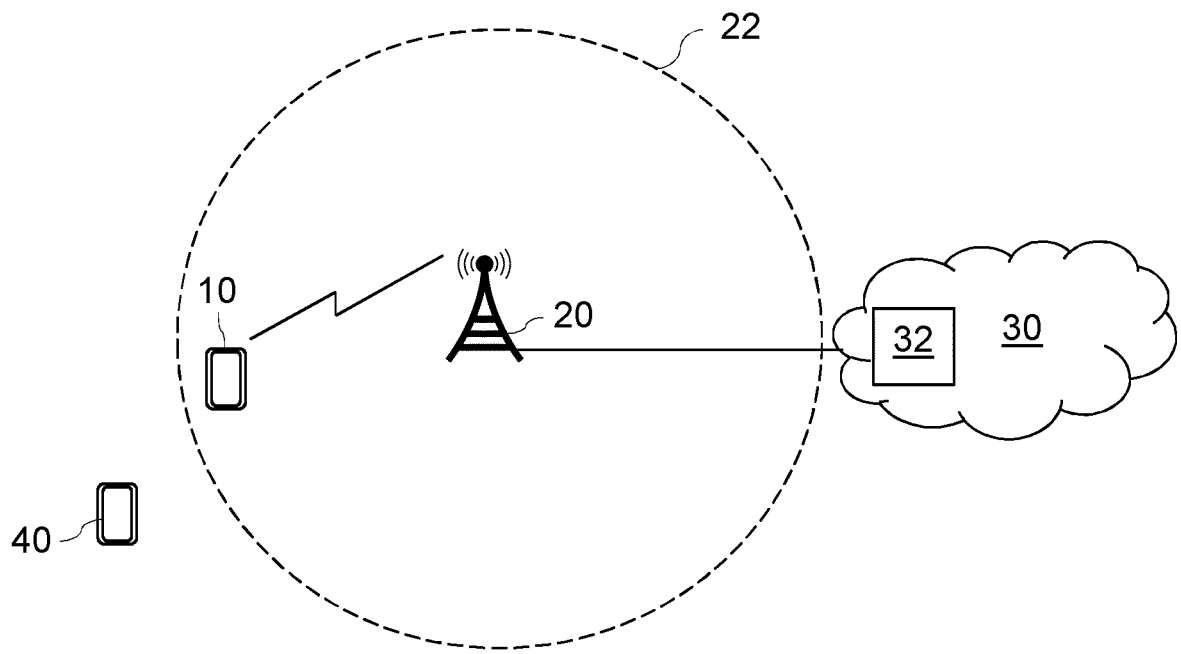
FIG. 1 illustrates an example wireless communication system.

FIG. 1 illustrates a simplified example system. A user equipment (UE) 10 communicates wirelessly with a radio access network (RAN) device, which may also be referred to as wireless or RAN node, hereafter referred to as AN, 20. Such RAN device or node AN 20 may be a NodeB, an evolved NodeB (eNB), a Next Generation (NG) NodeB (gNB), a base station, an access point, or other suitable wireless/radio access network device.

The UE 10 may be within a cell or coverage area 22 of the AN 20 and attached to the AN 20 for wireless communications. The air interface between UE and AN may be configured in accordance with a Radio Access Technology, RAT, which both the UE 10 and AN 20 are configured to support.

Examples of cellular RATs include Long Term Evolution, LTE, New Radio, NR, which is also known as fifth generation, 5G, and MulteFire. On the other hand, examples of non-cellular RATs include Wireless Local Area Network, WLAN, and Worldwide Interoperability for Microwave Access, WiMAX. Principles of the present disclosure are not limited to a specific RAT though. For example, in the context of LTE, AN 20 may be a nodeB or evolved Node B (eNB), while in the context of NR, AN 20 may be a gNB.

The AN 20 may be connected, directly or via at least one intermediate node, with one or more devices or elements 32 of a core network 30, such as a Next Generation core network, Evolved Packet Core (EPC), or other network management element. The core network 30 may comprise a set of network functions. A network function may refer to an operational and/or physical entity. For example, the element 32 may be a network function or be configured to perform one or more network functions. The network function may be a specific network node or element, or a specific function or set of functions carried out by one or more entities, such as virtual network elements. Examples of such network functions include an access control or management function, mobility management or control function, session management or control function, interworking, data management or storage function, authentication function or a combination of one or more of these functions.

For example, a 3GPP 5G core network comprises Access and Mobility Management Function (AMF) which may be configured to terminate RAN control plane (N2) interface and perform registration management, connection management, reachability management, mobility management, access authentication, access authorization, Security Anchor Functionality (SEAF), Security Context Management (SCM), and support for interface for non-3GPP access.

The core network 30 may be, in turn, coupled with another network (not shown), via which connectivity to further networks may be obtained, for example via a worldwide interconnection network. The AN 20 may be connected with at least one other AN as well via an inter-base station interface, particularly for supporting mobility of the UE 10, e.g. by 3GPP X2 or similar NG interface.

The UE 10 may be referred to as a user device or wireless terminal in general. Hence, without limiting to Third Generation Partnership Project (3GPP) User Equipment, the term user equipment is to be understood broadly to cover various mobile/wireless terminal devices, mobile stations and user devices for user communication and/or machine to machine type communication. The UE 10 may be or be comprised by, for example, a smartphone, a cellular phone, a Machine-to-Machine, M2M, node, machine-type communications node, an Internet of Things, IoT, node, a car telemetry unit, a laptop computer, a tablet computer or, indeed, another kind of suitable user device or mobile station, i.e., a terminal.

Additionally, although the apparatuses have been depicted as single entities, different units, processors and/or memory units (not all shown in FIG. 1) may be implemented inside these apparatuses, to enable the functioning thereof. The system may also be able to support the usage of cloud services, for example some of core network operations may be carried out as a cloud service. The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. One of the concepts for 5G networks is network slicing in which multiple independent and dedicated virtual sub-networks (network instances) may be created within the same infrastructure to run services that have different requirements on latency, reliability, throughput and mobility.

The person skilled in the art will realize that the depicted system is only an example of a part of a system and in practice, the system may comprise further access nodes, the user device may have an access to a plurality of radio cells and the system may comprise also other apparatuses, such as physical layer relay nodes or other core network functions or elements, etc. A cellular radio system may be implemented as a multilayer network including several kinds of cells, such as macrocells, microcells and picocells, for example. Typically, in multilayer networks, one access node provides one kind of a cell or cells, and thus a plurality of NodeBs are required to provide such a network structure. 5G may also utilize satellite communication to enhance or complement the coverage of 5G service, for example by providing backhauling.

Wireless communication systems, and at least some of the devices 10, 20, 40 of FIG. 1, may comprise an antenna module or array with multiple antenna elements to combine signals into one or more beams for beam-based transmission and reception. The devices may thus be configured to utilize their spatial degrees of freedom for beamforming their transmitted signals and/or placing nulls towards coexisting devices. In general, beamforming uses multiple antennas to control the direction of a wave-front by appropriately weighting the magnitude and phase of individual antenna signals in an array of multiple antennas. In beam-based communication, a directional signal may be transmitted in desired spatial direction by a beam. Multiple beams may thus be available for transmitting signals to and from the UE 10.

Device-to-device (D2D), Direct, or sidelink communication refers to one type of communication technology in which a communications device such as wireless terminal or network node communicates directly with another communications device. Examples are provided below with references to D2D, but is will be appreciated that various embodiments may be applied also for other direct communication technologies. D2D communication can require discovery operations and beam discovery for setting up the direct communications with another device.

The UE 10 may be configured to establish D2D communications with another wireless device or UE 40. The devices 10, 40 may apply D2D communication for direct connectivity between the devices and/or to extend coverage of the AN 20 and associated RAN. The UE 10 may be configured to operate as a relay and enable connectivity for the UE 40 via the AN 20. The AN 20 may be configured to control and/or assist D2D operations by the UE 10.

Moving on to higher carrier frequencies, D2D connectivity may need to employ analog frontends with multiple beam patterns in spatial domain to combat the difficult characteristics of the channel, e.g., signal attenuation. An initial access therefore requires for example the use of synchronization signal blocks (SSB) or synchronization signal/Physical Broadcast Channel (SS/PBCH), assigned for each unique analog beam, to sweep in spatial domain through the possible combinations of transmit (TX) and receive (RX) beams. This kind of beam acquisition selects the pair of TX and RX beams best suited for the D2D connection. However, it is noted that as the number of antennas N grows in the higher frequencies, the set of possible beam combinations increases as $N^2$. This results in longer beam acquisition latency as the SSB burst set, referring to a set of SSBs that are transmitted to cover an area within a time period, i.e. a set of beams and time/frequency domain resources used to transmit SSBs, is extended and the number of SSB transmissions in a burst grows with N in linear fashion.

There is now provided a solution facilitating to reduce such overhead, to reduce sweep and beam acquisition time. A network device, such as the AN 20, e.g. a gNB, may assist cell-edge devices or devices providing coverage to specific parts of the cell with coverage hole (lack of cell coverage), such as the UE 10, to reduce initial access beam sweep range for searching for out-of-coverage users, such as UE 40 unknown to or unassociated with the network device, to extend connectivity via the network device. In some cases, the UE 40 may be known to network or is within network coverage area, but it may prefer to use or is configured to use D2D connection as relay to network due to better link quality. It should be noted that the solution provided herein is not limited for only initial access but may also facilitate coverage extension and/or mobility in the extended coverage area, e.g. by means of beam management.

Figure 2:
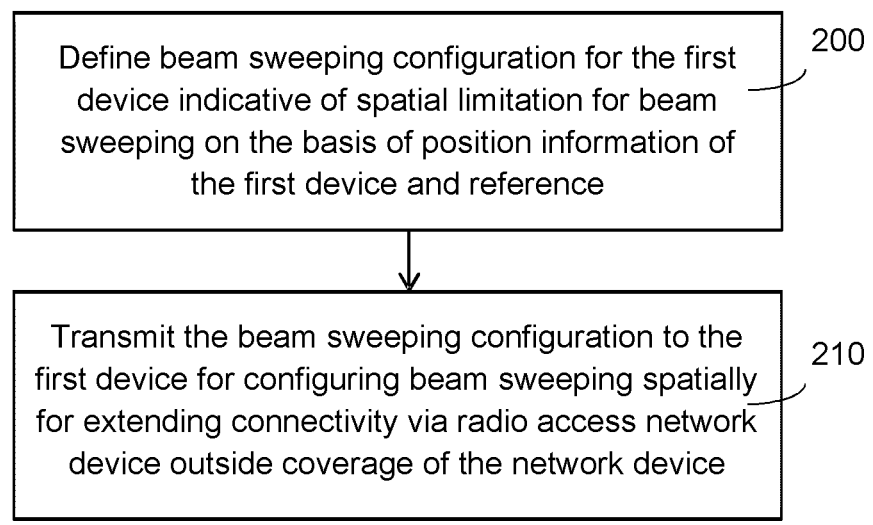
FIGS. 2 and 3 illustrate methods in accordance with at least some embodiments.

FIG. 2 illustrates a method for facilitating network assisted beam sweeping. The method may be performed in or caused by a radio access network node or device, such as the AN 20, or a controller thereof.

The method comprises defining 200 a beam sweeping configuration for a first device indicative of spatial limitation for beam sweeping on the basis of position information of the first device and a reference. The beam sweeping configuration is transmitted 210 to the first device for configuring beam sweeping spatially for extending connectivity via the network device outside coverage of the network device (from which the beam sweeping configuration may be transmitted).

Figure 3:
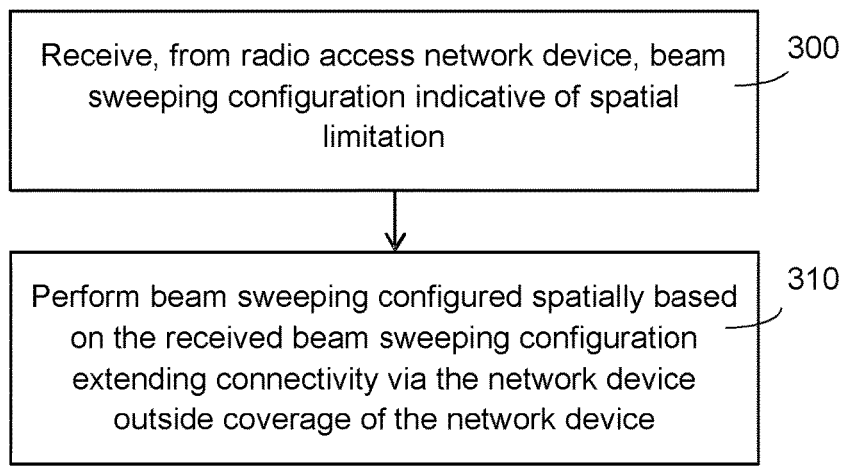

FIG. 3 illustrates a method for network assisted beam sweeping. The method may be performed in or caused by a wireless communications apparatus or device, such as the UE 10, or a controller thereof.

Block 300 comprises receiving, from a radio access network device, a beam sweeping configuration indicative of spatial limitation in relation to a reference. Beam sweeping is performed 310 for extending connectivity via the network device outside coverage of the network device. The beam sweeping is configured spatially based on the received beam sweeping configuration.

The beam sweeping may be TX beam sweeping and/or RX beam sweeping. Thus, beam sweeping for transmission and/or beam sweeping for reception may be individually spatially limited on the basis of the beam sweeping configuration. The reference may be a fixed or dynamic reference known by the network device and the wireless device, and may also be referred to as a reference point or anchor point, for example. The reference may be preconfigured or indicated by the network device to the first device, e.g. in the beam sweeping configuration. The beam sweeping configuration may thus define angular spread in relation to the reference.

On the basis of the information in the received beam sweeping configuration received from the network device, the first device may perform a reduced beam sweep to discover one or more other wireless devices for which connectivity via the network device may be extended. The first device may thus on the basis of the beam sweeping configuration define and apply a reduced set of beams that are a subset of a full set of beams available for transmitting and/or receiving from an antenna module. Block 310 may thus comprise determining a reduced set of beams to sweep substantially outside coverage area of the network device.

Performing the reduced beam sweep may include scanning a reduced set of beam angles in spatial domain (e.g. azimuth and/or elevation angles indicated in the beam sweeping configuration) corresponding to the reduced set of beams. The full set of beams may correspond to a full set of beam angles available for transmitting and/or receiving by the antenna module. On the basis of the reduced beam sweep, a beam may be selected out of the reduced set of beams for transmitting and/or receiving by an antenna module of the first device. The beam sweeping configuration thus allows the first device, which may be a cell-edge user, to focus on only the relevant sweeping range in spatial domain, reducing the overall beam acquisition overhead.

The methods may be applied for beam sweeping for D2D discovery. Based on the beam sweeping and D2D discovery, connectivity via the network device may be extended by the first device operating as a relay or sidelink device.

The (TX and/or RX) beam sweeping may be triggered by the network device. The beam sweeping may be performed by the first device to discover one or more wireless devices, which may be referred to as a second device, such as the UE 40. The second device may be unassociated with the network device for D2D communication. The unassociated second device is not known by the network device or may not be directly connected to the network. The second device may be out of coverage area of the network device and may be non-connectable by the second device, or has limited connectivity, e.g. poor signal quality. The beam sweeping configuration may comprise information for determining a reduced set of beams to sweep outside coverage area of the network device for discovering the second device unassociated with the network device for D2D communication with the first device. For example, the UE 10 may thus operate as a D2D synchronization master for establishing D2D connection for the UE 40 discovered based on the beam sweeping. The UE 10 may thus enable sidelink or coverage extension for the AP 20, and connectivity for the UE 40 to the AP 20.

The first device may, e.g. in a block preceding block 200, be selected or identified, among a set of wireless devices associated with a radio access network device, to extend coverage of/via the network device in response to detecting that the first device is located at a coverage edge area of the network device. The first device may be detected to qualify as a candidate node for providing out of coverage access for other devices. The network device may select the first wireless device to operate as a relay or sidelink node for extending cell coverage of the network device. The beam sweeping configuration may be transmitted in a message indicative of a request to operate as a relay or sidelink node.

The first device may be selected or identified on the basis of at least one of:
- signal quality measurement information (associated with the first device), such as beam or cell quality reference signal received power (RSRP) measurements, reference signal received quality (RSRQ), and/or signal-to-interference-plus-noise ratio (SINR) measurements performed by the network device and/or the first device,
- position/location information of the first device and/or cell coverage information of the network device,
- capabilities of the first device, such as availability of multiple antenna panels and orientation of the first device,
- an indication or information of line-of-sight communication link of the first device and the network device, and
- an indication or a request of being a candidate for connectivity extension received from the first device.

The position information of the first device and cell coverage information may be applied when the network device has knowledge of its coverage, based on for example statistics of previous successful connections, and up-to-date positioning information for the first devices that indicate the device is at the cell edge. In some cases the position or location information may be based on information of which DL reference signals the first device is able to detect, which reference signals have quality above a threshold level, and/or which signal resources have been configured for communication/measurement purposes for the first device. For example, such signal information may comprise one or more of reference signal type, resource set or resource ID, and/or ID associated with multiple resource sets associated with a single TRP to uniquely identify reference signal resource. In one example, if the first device is within a coverage are of a specific SSB/Non-Zero-Power (NZP)-Channel State Information (CSI-RS)—, the network device may determine UE location based on that information.

The network device may be aware of the cell coverage area (e.g. coverage area 22 by the AN 20), for example, based on signal measurements, and/or positioning information based on previous connections. The network device is also aware of devices (UE 10) inside the coverage area (22) and attempting or capable of attempting D2D connections. The network device may obtain position information of the first device from the first device and/or by a network based positioning method. This embodiment enables to detect UEs existing at cell edge (or detect UEs that may provide coverage within the cell for areas with poor coverage), despite having a strong connection to the RAN.

If the first device detects it is at the cell edge or determines that it is a candidate or has suitable conditions to provide coverage extension, it can report this to the network device.

In an example, a gNB may request UE to provide indication on SSB basis: if a UE is under coverage of specific SSB (i.e. one or more of the UE can detect the SSB, measure the SSB with quality above a threshold level, the UE has been configured with the SSB for communication purposes, or the SSB is e.g. the source beam for downlink control/shared channel reception), the UE may indicate network that it is in coverage of specific SSB. The SSB specific sweeping information may be preconfigured.

In an embodiment, signal quality threshold or thresholds are configured by the network device to the first device which detects based on signal measurements that it is a cell edge device or a candidate device for extending the coverage when threshold-based condition is fulfilled. Thus, the first device may transmit an indication thereof to the network device, which may on the basis of the indication select the first device, and define and transmit the beam sweeping configuration for the first device.

For example, threshold TH1 is configured and when the UE 10 determines that beam/cell quality is below the TH1 level it indicates this to the AN 20. The cell quality may be derived or determined based on measurements on one or more beams. In another example, when two thresholds (TH1 and TH2) are configured, the UE 10 indicates the AN 20 when beam/cell quality is below TH1 but above TH2. In this manner the AN 20 may obtain information on potential D2D users that can extend coverage. The UE may also be required to indicate when the threshold condition does not apply. As an example, configuring two thresholds with different values enables the AN 20 to select UEs 10 that have sufficiently high signal quality but potentially low enough to be considered as "cell edge" users or coverage edge users.

By setting thresholds for signal measurements for cell edge device detection, the gNB can find through a given UE feedback if the UE is 1) not too close to the gNB (i.e., near the cell center), and 2) not too far from the gNB for the connection to be too weak. Then, the UE can be a candidate for out-of-coverage initial access and relaying.

Figure 4:
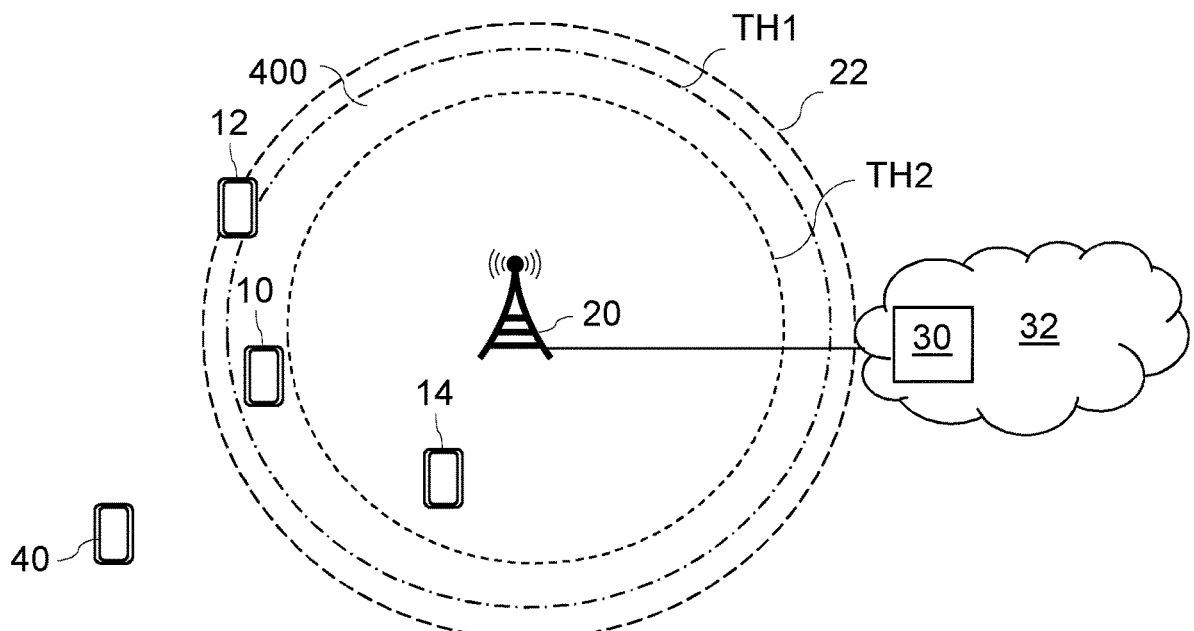
FIGS. 4 and 5 illustrate example scenarios for defining cell-edge devices.
Figure 5:
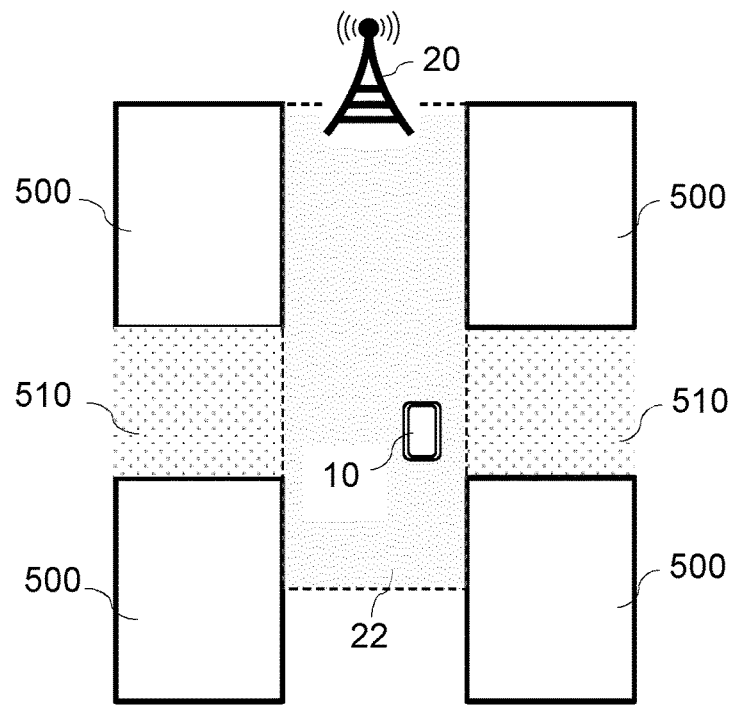

FIGS. 4 and 5 illustrate example scenarios for defining cell-edge devices. In FIG. 4, among devices 10, 12, 14 within coverage area 22 of the AN 20, the AN 20 may detect only UE 10 to be suitable for out-of-coverage relaying because it is detected to be in appropriate cell-edge area 400 defined by thresholds TH1 and TH2.

FIG. 5 illustrates an example, where blockages 500 cause out of coverage areas 510 and limit the coverage area 22 for the AN 20. Due to the blockages, the UE 10 may have a strong signal quality although it is positioned near the edge of the coverage area of the AN 20. Thus, the AN 20 may detect the UE 10 as candidate for (D2D based) coverage extension, on the basis the position information of the UE 10 and the information of the coverage 22.

The first device (and possibly other devices 50 associated with the network device) may be configured to define and transmit assistance information for the network device for affecting or to be used as input for defining 200 the beam sweep configuration. The network device may thus define the beam sweeping configuration, and thus beam sweeping range reduction, on the basis of the received assistance information. The network device may configure one or more signal thresholds, or other configuration parameters, to the first device, on the basis of which the assistance information for defining beam sweep configuration may be defined. This may comprise or be performed similarly as illustrated above for the assistance information for identifying the first device as cell edge device.

For example, such assistance information may include, but is not limited to, relative AoA angle associated with specific DL RS e.g. SSB, NZP-CSI-RS, PRS. The first device may be configured to provide one or multiple reported DL RS+AoA based on e.g. time of flight, RSRP, etc.

The beam sweeping configuration may indicate an out of coverage sweeping range for limiting angular spread of the beam sweeping by the first device to areas outside coverage of the network device. The beam sweeping configuration may indicate or comprise beam sweeping directions in spatial domain. There are plurality of options for arranging the beam sweeping configuration to be indicative of the spatial limitation in azimuth and/or elevation domain. For example, the beam sweeping configuration may define target beam sweeping area in relation to the reference or an area (in relation to the reference) to be excluded for the beam sweeping.

Beam sweeping range may be defined by the beam sweeping configuration by applying one or more of the following elements: Relative angle spread may be defined in azimuth domain by +−x degrees with respect to a relative reference point. Relative angle spread in elevation domain given by +−y degrees with respect to a relative reference point. As configured by the network, such angle spreads are defined for covering directions where potential D2D target UEs might be located, for example, in street intersections where the network coverage is parallel to one road but blocked along the other. The beam sweeping configuration may avoid redundant sweeping of the area already within network coverage, as any UE attempting D2D connection there can be indicated to the sweeping UE by the network.

In some examples, the angle spread can be a bit vector with length of L-bits, where each element of the vector is mapped with some RRC/MAC CE pre-configured angle spread values. Granularity of the sweep in azimuth and/or elevation domains may be defined according to capability of network device. The sweep granularity information can be also used to control coverage of the transmission. The sweeping granularity can be a bit vector with length of K-bits, where each element of the vector is mapped with some RRC/MAC CE pre-configured sweep granularity values.

The beam sweeping based on the beam sweeping configuration may be applied for RX and/or TX beams. In one example the TX beams used to transmit the sweep as configured or determined by the first device may have corresponding RX beams. The beam sweeping configuration may be common for both TX and RX beam sweeping. In another example, the network device may configure the first device with a specific TX sweeping configuration and/or an RX sweeping configuration, which may be different.

The first device may perform RX beam sweeping to receive initial access attempts from out of coverage devices (e.g. UE 40) or receive D2D discovery signals or SRS or the like.

In one example embodiment, regarding the transmission power, for the beam sweeping, the first device may be configured to:
 a. select TX power autonomously
 b. use fixed power for all the beams associated with each antenna panel or overall antenna panels, or
 c. apply TX power per beam basis.

In one example, the network device may configure the first device with a set of resources for the beam sweeping. In one example the set of resources may implicitly indicate the first device to select proper coverage for transmission of each beam (e.g. select beam width and transmission power). As an example, the AN 20 may provide the UE 10 with multiple, e.g. 4 transmission resources and a sweep range of e.g. 60 degrees, meaning that the UE 10 should cover the 60 degrees sector within 4 time units. The UE 10 may be configured with or it may be specified that the UE would divide the covered area so that a portion, e.g. 15 degrees, of the sector is covered in one time unit. In another example, the AN 20 may provide the UE 10 with target time e.g. periodicity and based on the configured resources, the UE determines the covered area/sector in one time unit. These features may be applied for azimuth and/or elevation sweeping.

Figure 6A:
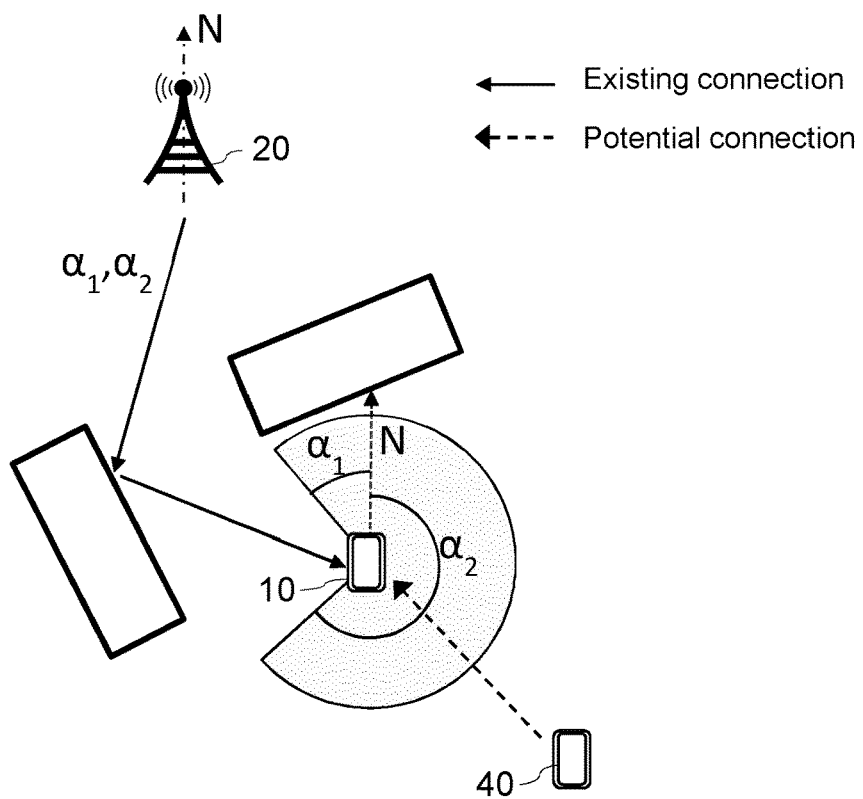
FIGS. 6a and 6b illustrate examples of beam sweeping ranges in relation to a reference.

In some example embodiments, the reference is a fixed or global reference direction, such as compass direction or a hardcoded direction in industrial applications. The reference may be a compass direction or an offset value in angular domain in respect to the compass direction. FIG. 6a illustrates an example of using a fixed reference, in this example the compass north direction N. The AN 20 may report the beam sweeping configuration in the angular domain with the angles α1 and α2 in relation to the north direction N. Use of a fixed reference may be applied particularly in non-line-of-sight (NLOS) situations.

Figure 6B:
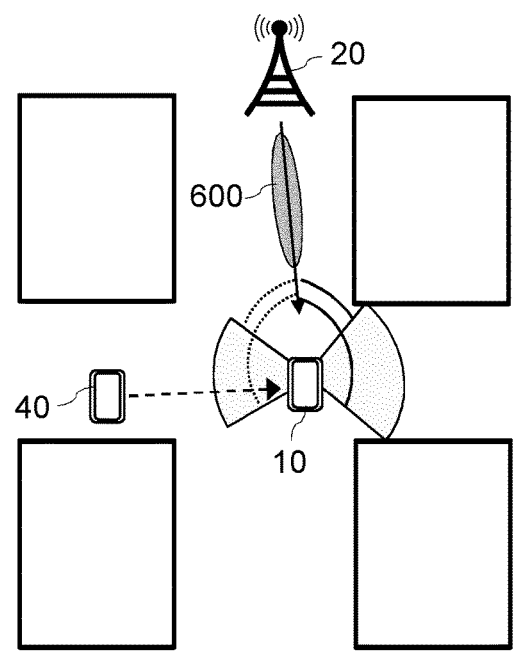

In some example embodiments, the reference is a reference beam between the first device and the network device. FIG. 6b illustrates a LOS scenario, where the beam 600 of the UL or DL resource is used as the reference. In this example, the AN 20 reports the beam sweep configuration indicative of two sets of angles in respect to the beam 600.

The beam sweeping configuration may be indicative of one or more of: transmission configuration indicator (TCI) state associated with a control resource set (CORESET) (i.e. the PDCCH TCI state), TCI of physical downlink shared channel (PDSCH), the DL RS resource that is the quasi-colocation (QCL) source, TCI state of physical uplink shared channel, TCI state of physical uplink control channel, SS/PBCH Block Index of the serving cell, NZP-CSI-RS resource index/channel state resource indicator (CRI) (wherein a CSI-RS may be associated to specific TRP), PRS resource index (e.g. if UE has active positioning service running at the network), and UL sounding reference signal (SRS) resource indicator (SRI). Such resource indication information may be applied for controlling the beam sweeping and reference therefor.

In some embodiments, the network device 10 defines the beam sweeping configuration based on radio transmission and/or reception capabilities of the first device.

For example, a gNB calculates the out-of-coverage beam sweeping configuration based on the cell-edge user's position information and its TX/RX capabilities, with respect to the configured reference point. As an example of TX/RX capabilities may be the UE capability regarding number of TX/RX beams at the UE required to for full sphere (or only azimuth or elevation) coverage at the UE. Another example includes number of UE antenna panels and or capability to have active one or more panels for TX or RX.

In addition to indicating the spatial limitation, the beam sweeping configuration may comprise further information for controlling the beam sweeping and/or discovery of other devices outside the coverage area of the network device by the first device. In some examples, the beam sweeping configuration indicates or comprises resource information for discovery signaling operations, such as uplink reference signal resource. The first device is configured to perform the beam sweeping and/or discovery operations in accordance with such received control information. In an example, the network device may configure the first device to transmit specific system information as part of the discovery signal (e.g. SSB or sidelink SSB). In a still further example, the network device may configure the first device to transmit only reference signal, e.g. to operate as synchronization source for out of coverage users.

In an example embodiment, the beam sweeping configuration comprises at least one signal measurement threshold for selecting and/or omitting one or more beams for the beam sweeping based on signal measurements by the first device.

The beam sweeping configuration may be transmitted in a layer 1, layer 2, or layer 3 control message, or a combination of messages. In some example embodiments, the beam sweeping configuration is included as medium access control (MAC) layer control element (MAC CE) and/or radio resource control (RRC) signaling. For example, the beam sweeping configuration may be included in a physical downlink control channel (PDCCH), e.g. as part of downlink control information (DCI).

Upon receiving the beam sweeping configuration, the first device configures TX and/or RX beam sweeping by an antenna module spatially. Two or more antenna elements may be used for beamforming for directional signal transmission or reception. Beamforming may be achieved by combining elements in a phased array such that signals at particular angles experience constructive interference while other signals experience destructive interference. Increasing the number of antenna elements participating in beam forming increases the directivity of the resulting beam. The beam sweeping may comprise performing a first antenna beam sweeping by a first antenna module of the first device, such as the UE 10, and performing a second antenna beam sweeping by a second antenna module of the first device. A first beam may be selected based on the first antenna beam sweeping. The second antenna beam sweeping may comprise selecting a second beam by the second antenna module independently of the first antenna beam sweeping performed by the first antenna module.

A signal, in some example embodiments a discovery or an access initiation signal, such as a reference signal, a sounding signal, a pilot signal, or a synchronization signal, broadcast information, system information, D2D specific system information may be transmitted by the first device in block 310 in the beams of the reduced set of beams. The signal may thus be a broadcast signal and may comprise system and/or D2D broadcast information.

Beam information comprising information related to one or more signal characteristics associated with the signal may be received in response to the transmitted discovery or access initiation signal. The beam information may comprise one or more of received signal strength/power, signal to noise ratio, or signal to noise-and-interference ratio of the signal that was transmitted by the first device.

As already indicated above, the RX beam sweeping may be configured in the first device, and the first device may thus receive such signal, such as DL reference signal, in beams of the reduced set of beams and obtain the beam information based on the received signal in the reduced set of beams. One or more beams may then be selected for transmission and/or reception by the antenna module based on the received beam information. For example, the beam information may be based on UL or DL reference signal, UL sounding signal, UL or DL pilot signal, or UL synchronization signal. The first device may then perform a D2D connection establishment procedure, according to applied D2D protocol. After establishment of the D2D connection, connectivity for the second device via the first device may be provided. A connection of the first device with the network device may be applied for data transfer of the second device.

A dynamic triggering mechanism at a network device, such as a gNB, can thus provide assistance information for a set of D2D devices (e.g. UEs or sidelink UEs) to transmit in a spatial domain (i.e. azimuth and/or elevation) a configured discovery signal, e.g. SSB or sidelink (SL) SSB resources and/or uplink reference signal (RS) (e.g. SRS or UL signal (e.g. physical random access channel (PRACH)) resources.

In an example embodiment, the first device further refines the beam sweeping configuration for further reducing spatial range for the beam sweeping. For example, the UE 10 may utilize beam-specific measurements of the DL reference signal resource from the AN 20 and omit beams with levels above a set threshold from the configuration. The network device may configure, by RRC layer signaling, MAC layer signaling, and/or physical layer signaling, one or more threshold values associated with measurement configuration for coverage enhancement that measured downlink resources being above the configured threshold value(s) are not to be used as TX spatial directions for beam sweeping by the first device. Thus, the beam sweeping may ignore spatial directions in which the AN 20 measured signal-level associated with configured downlink reference signal or SSB is sufficiently strong, e.g. in-coverage spatial directions or other avoidable/blocked spatial directions where configured DL measurement resources may be associated with a neighboring cell or TRP, or another UE/network node to avoid interference.

The first device may receive two or more beam sweeping configurations, each of which configurations is based on at least two different radio access network coverage areas. The first device may then determine a joint beam sweeping configuration on the basis of the at least two different beam sweeping configurations for focusing the beam sweeping outside both of the at least two radio access network coverage areas.

Figure 7:
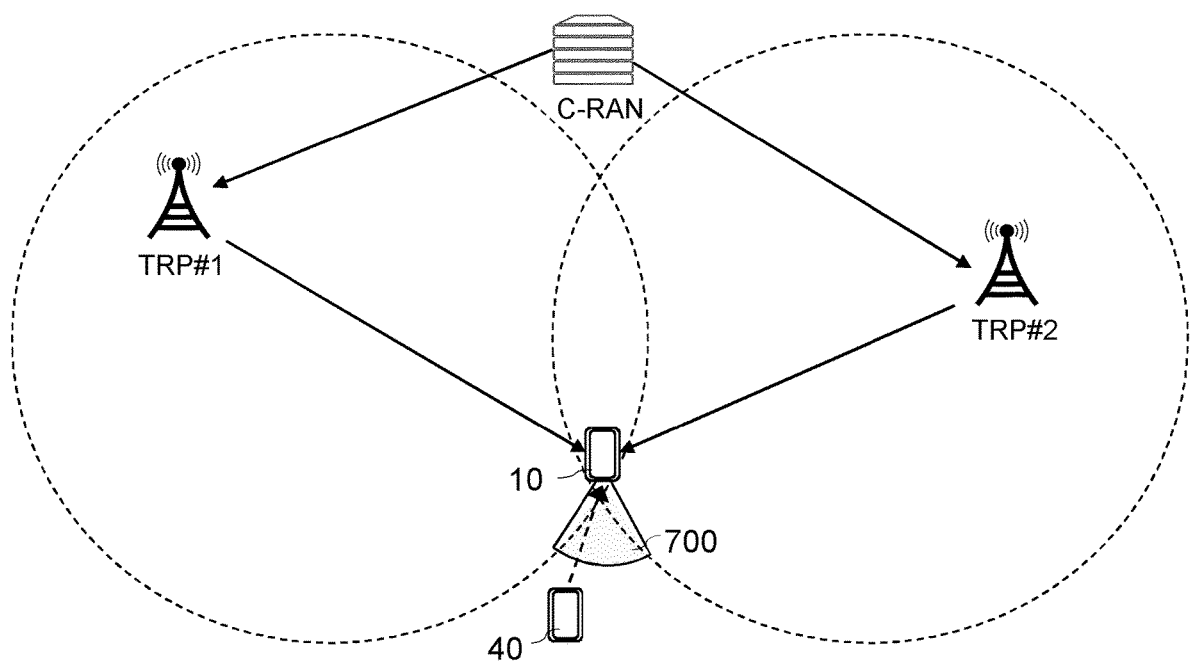
FIG. 7 illustrates an example of a joint beam sweeping configuration.

The beam sweeping configuration may be defined based on two or more coverage areas, such as cells of two or more base stations, RANs, APs or transmission/reception points (TRPs). With reference to the example of FIG. 7, if the UE 10 is served by multiple TRPs, TRP #1 and TRP #2, and is considered a potential relay UE within multiple coverages, the (out-of-coverage) beam sweeping configuration can be defined jointly. The joint configuration may be defined by angular domain intersection of the individual TRP sweeping configurations.

Initial access beam sweeping by the UE 10 may thus be configured in the area 700 that is substantially (or mainly) outside the coverage of the TRPs. The joint beam sweeping configuration can be defined centrally, e.g. by cloud or centralized RAN (C-RAN) element and reported to the UE. Alternatively, upon receiving multiple (TRP-specific) configurations, the UE can refine the final beam sweep angles by defining the angular domain intersection area 700. Upon receiving multiple beam sweeping configurations from separate TRPs, instead of a joint configuration, the UE 10 can thus determine the intersection of the received configurations, and thus calculate the joint beam sweeping configuration.

The network device may be configured to select further device(s), which may be referred to as a third device, among a set of associated wireless devices to operate as a relay node for extending coverage of the network device. The network device may then define a second beam sweeping configuration for the third wireless device, which indicates a beam sweeping range which is at least partly different than a beam sweeping range indicated by the beam sweeping configuration for the first device.

Figure 8A:
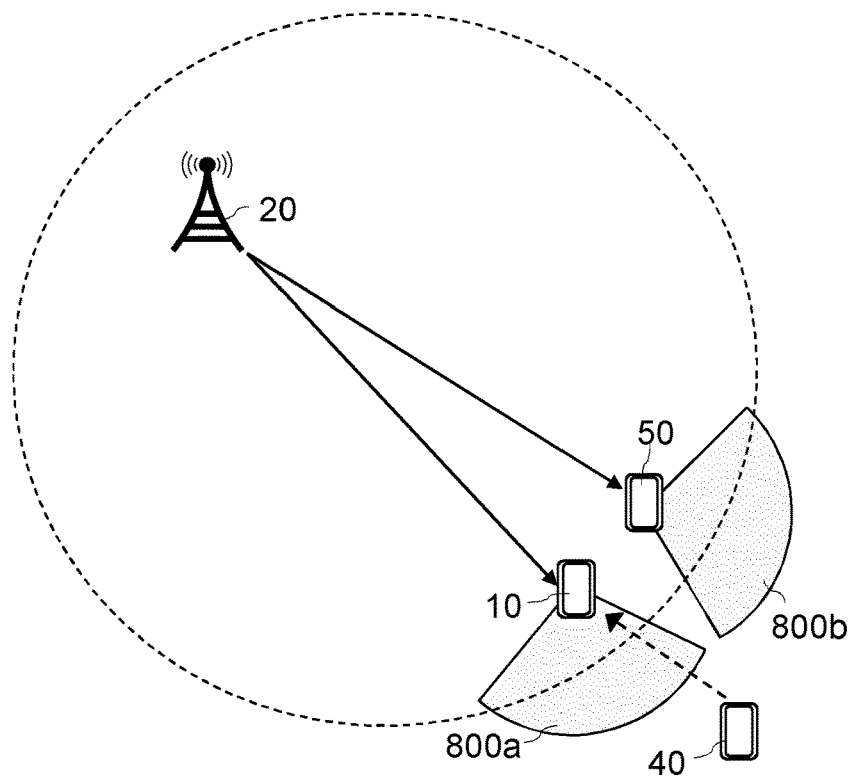
FIGS. 8a and 8b illustrate examples of dividing beam sweeping configuration for multiple devices.

Reference is made to the example of FIG. 8a, in which the AN 20 designates both UE 10 and UE 50 to operate as (potential) relays. The AN 20 may thus divide the total beam sweeping range for the UEs 10 and 50, to comprise beam ranges 800a, 800b specifically defined for the respective UEs, directed substantially outside the coverage area of the AN 20.

In cases where there are multiple co-located UEs near the cell edge, each a potential relay UE, the AN 20 can hence divide the beam sweeping configuration among the UEs 10, 50 and report the separate configurations to the respective UEs. A single wide set of beam sweeping angles can thus be divided among multiple UEs, enabling to perform the initial access sweep at an UE with fewer SSBs and reduce sweeping time.

The first device may be configured to define a portion of a beam sweeping range indicated by the beam sweeping configuration to another wireless device, which may be referred to as the third device. The first device may then perform D2D communication with the third wireless device to assign the portion of the beam sweeping range to the third device.

Figure 8B:
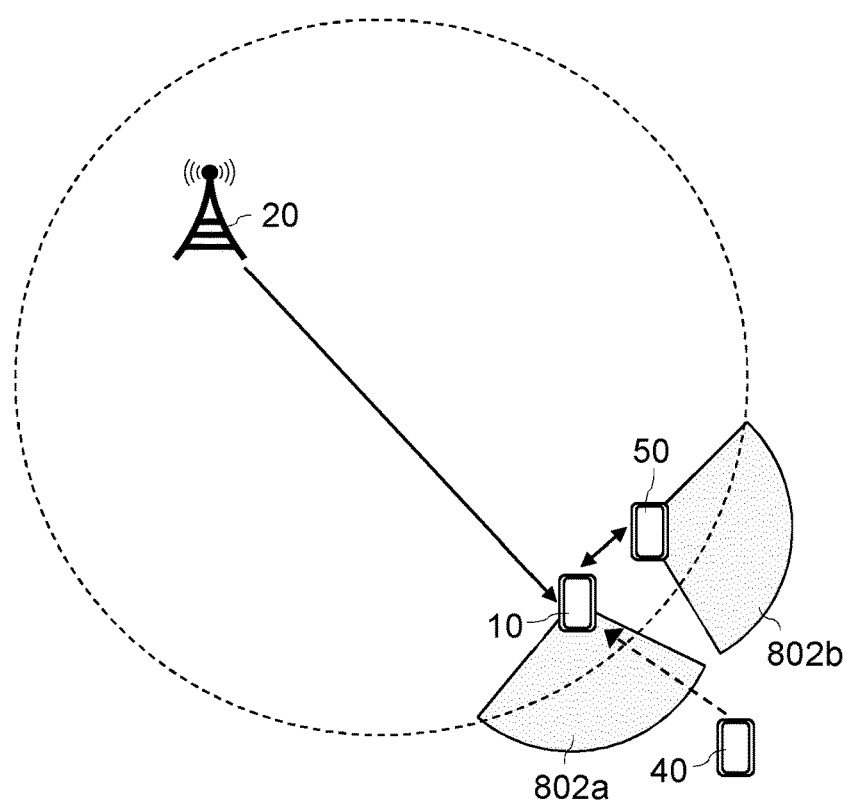

FIG. 8b illustrates an example in which the AN 20 transmits a beam sweeping configuration to a cell-edge UE 10 that is to act as a relay. The relay UE 10 may then divide the sweeping configuration among another UE 50 to form beam ranges 802a, 802b for the respective UEs. For example, if there is already an existing D2D connection between the cell-edge UEs, the UE 10, which may operate as master UE, may decide to divide a single wide beam sweeping configuration among the partnered UE(s) 50 of the D2D connection.

In another example, group of cell-edge UEs 10, 50 may communicate via a D2D connection and divide the beam sweeping configuration into multiple UE-specific configurations with the beams of the D2D link as reference. This sweeping range division can be applied when group of cell-edge UEs are in close enough vicinity, where the beam sweeping configurations would be highly similar. Obtaining the sweeping range from the network, the master UE, the UE 10, can divide the full sweeping range among the group, possibly also accounting for individual UE TX capabilities, and inform the individual UE-specific sweeping ranges via the existing D2D connections, thus enabling the sweeping of the network-indicated out-of-coverage area with fewer SSB resources per UE. In further example, if network has configured both UEs to cover similar sector, e.g. 100 degrees, UEs may divide the UE specific sector such as that first device, UE 10, covers 50 degree sector and another UE 50 covers another 50 degree sector (non-overlapping to UE1 sector). It may also be possible to configure partially overlapping sector between UEs to ensure coverage.

Example embodiments of the methods can be related to 3GPP NR radio-technology enhancements. Though, it is noted that any reference to 3GPP/NR elements or information in this application is used as example to describe some example embodiments, and other technologies can also applied. The network device/AN 20 is (or is configured to operate as) a gNodeB (gNB) comprising an NR-U transceiver. The first/second/third (wireless) device may be a 3GPP User Equipment comprising an NR-U transceiver, for example.

While some embodiments have been described in the context of 5G NR—U based systems, it should be thus appreciated that these or other embodiments of the invention may be applicable in connection with other technologies configured to operate on licensed or non-licensed band, such as 6G cellular systems, or other existing or future technologies facilitating spatially limited beam sweeping.

Any of the embodiments, described herein are not limited to D2D operation but may be applied also to fixed/mobile relay nodes, IAB nodes (integrated access and backhaul) or the like. In one example, the first device or a D2D device described herein may be an IAB node.

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device or a vehicle communications unit for vehicle to anything (V2X) communications), a wearable device, a base station, access point device, a network function element or node, or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 9:
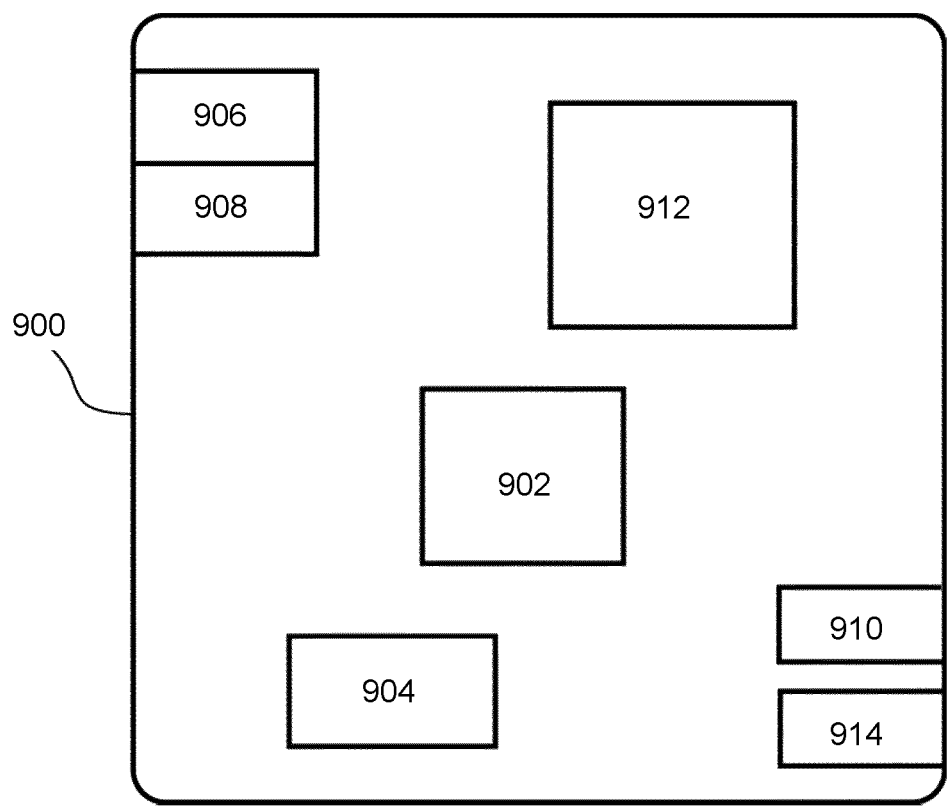
FIG. 9 illustrates an example apparatus capable of supporting at least some embodiments.

FIG. 9 illustrates an example apparatus capable of supporting at least some embodiments of the present invention. Illustrated is a device 900, which may comprise a communications device arranged to operate as the UE 10 or the AN 20, for example. The device may include one or more controllers configured to carry out operations in accordance with at least some of the embodiments illustrated above, such as some or more of the features illustrated above in connection with FIGS. 2 to 8. The device may be configured to operate as the apparatus configured to perform the method of FIG. 2 or FIG. 3, or embodiments thereof, for example.

Comprised in the device 900 is a processor 902, which may comprise, for example, a single- or multi-core processor wherein a single-core processor comprises one processing core and a multi-core processor comprises more than one processing core. The processor 902 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The device 900 may comprise memory 904. The memory may comprise random-access memory and/or permanent memory. The memory may comprise at least one RAM chip. The memory may comprise solid-state, magnetic, optical and/or holographic memory, for example. The memory may be at least in part accessible to the processor 902. The memory may be at least in part comprised in the processor 902. The memory 904 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 900 but accessible to the device. For example, control parameters affecting controlling operations illustrated in connection with FIG. 2 or FIG. 3 may be stored in one or more portions of the memory and used to control operation of the apparatus. Further, the memory may comprise other control parameters, for example.

The device 900 may comprise a transmitter 906. The device may comprise a receiver 908. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, WLAN, and/or Ethernet standards, for example. The device 900 may comprise a near-field communication, NFC, transceiver 910. The NFC transceiver may support at least one NFC technology, such as NFC, Bluetooth, Wibree or similar technologies.

The device 900 may comprise user interface, UI, 912. The UI may comprise at least one of a display, a keyboard, a touchscreen, a vibrator arranged to signal to a user by causing the device to vibrate, a speaker and a microphone. A user may be able to operate the device via the UI, for example to initiate or receive communication sessions via the transmitter 906 and the receiver 908, to operate applications performed in the device, to manage digital files stored in the memory 904 or on a cloud accessible via the transmitter 906 and the receiver 908, or via the NFC transceiver 910, and/or to control operation of the device.

The device 900 may comprise or be arranged to accept a user identity module or other type of memory module 914. The user identity module may comprise, for example, a subscriber identity module, SIM, and/or a personal identification IC card installable in the device 900.

The processor 902 may be furnished with a transmitter arranged to output information from the processor, via electrical leads internal to the device 900, to other devices comprised in the device. Such a transmitter may comprise a serial bus transmitter arranged to, for example, output information via at least one electrical lead to memory 904 for storage therein. Alternatively to a serial bus, the transmitter may comprise a parallel bus transmitter. Likewise the processor may comprise a receiver arranged to receive information in the processor, via electrical leads internal to the device 900, from other devices comprised in the device 900. Such a receiver may comprise a serial bus receiver arranged to, for example, receive information via at least one electrical lead from the receiver 908 for processing in the processor. Alternatively to a serial bus, the receiver may comprise a parallel bus receiver.

The device 900 may comprise further devices not illustrated in FIG. 9. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 910 and/or the user identity module 914.

The processor 902, the memory 904, the transmitter 906, the receiver 908, the NFC transceiver 910, the UI 912 and/or the user identity module 914 may be interconnected by electrical leads internal to the device 900 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus, comprising:
   at least one processor; and
   at least one non-transitory memory including computer program code, the at least one memory and the computer program code configured to, with the at least one processor, cause the apparatus to:
   receive, from a radio access network device, a beam sweeping configuration indicative of spatial limitation in relation to a reference,
   perform beam sweeping configured spatially based on the received beam sweeping configuration for extending connectivity via the network device outside coverage of the network device, and
   perform refining the beam sweeping configuration for reducing spatial range for the beam sweeping.

2. The apparatus of claim 1, wherein the at least one memory and the computer program code are configured to, with the at least one processor, cause the apparatus to perform transmission and/or reception beam sweeping to discover a second device unassociated with the network device for device-to-device communication.

3. The apparatus of claim 1, wherein the at least one memory and the computer program code are configured to, with the at least one processor, cause the apparatus to determine a reduced set of beams to sweep outside coverage area of the network device, and select at least one beam of the reduced set of beams for transmitting and/or receiving with an antenna module of the first device.

4. The apparatus of claim 3, wherein the at least one memory and the computer program code are configured to, with the at least one processor, cause the apparatus to perform:
- transmitting, with the antenna module, one or more of a reference signal, a sounding signal, a pilot signal, a synchronization signal, system broadcast information, and device-to-device broadcast information in at least one beam of the reduced set of beams; and
- receiving beam information comprising information related to one or more signal characteristics associated with the one or more of the reference signal, the sounding signal, the pilot signal, the synchronization signal, system broadcast information, and device-to-device broadcast information, and wherein the selecting the beam out of the reduced set of beams comprises selecting the beam based on the received beam information.

5. The apparatus of claim 1, wherein the at least one memory and the computer program code are configured to, with the at least one processor, cause the apparatus to perform:
- receiving at least two beam sweeping configurations, each of which configurations is based on at least two different radio access network coverage areas, and
- determining a joint beam sweeping configuration on the basis of the at least two different beam sweeping configurations for focusing the beam sweeping outside both of the at least two radio access network coverage areas.

6. The apparatus of claim 1, wherein the at least one memory and the computer program code are configured to, with the at least one processor, cause the apparatus to perform device-to-device communication with a third wireless device to assign a portion of a beam sweeping range indicated with the beam sweeping configuration to the third device.

7. The apparatus of claim 1, wherein the at least one memory and the computer program code are configured to, with the at least one processor, cause the apparatus to perform defining assistance information on the basis of at least one signal quality threshold from the network device, and transmitting the assistance information to the network device for defining the beam sweeping configuration and/or identifying the first device for extending the coverage area.

8. The apparatus of claim 1, wherein the beam sweeping configuration indicates a spatial sweeping range for limiting angular spread of transmission and/or reception beam sweeping by the first device to areas outside coverage of the network device.

9. The apparatus of claim 1, wherein the beam sweeping configuration indicates or comprises at least one of:
- beam sweeping directions in spatial domain,
- resource information for discovery signaling operations, or
- at least one signal measurement threshold for selecting or omitting one or more beams for the beam sweeping based on signal measurements by the first device.

10. An apparatus for a radio access network device, comprising:
- at least one processor; and
- at least one non-transitory memory, the at least one memory and the computer program code configured to, with the at least one processor, cause the apparatus to perform:
- defining a beam sweeping configuration for a first device indicative of spatial limitation for beam sweeping on the basis of position information of the first device and a reference,
- transmitting the beam sweeping configuration to the first device for configuring beam sweeping spatially for extending connectivity via the network device outside coverage of the network device,
- receiving assistance information for beam sweeping range reduction from at least the first device, and
- defining the beam sweeping configuration on the basis of the received assistance information.

11. The apparatus of claim 10, wherein the beam sweeping configuration comprises information for determining a reduced set of beams to sweep outside coverage area of the network device for discovering a second device unassociated with the network device for device-to-device communication with the first device.

12. The apparatus of claim 10, wherein the at least one memory and the computer program code are configured to, with the at least one processor, cause the apparatus to perform defining the beam sweeping configuration based on radio transmission and/or reception capabilities of the first device.

13. The apparatus of claim 10, wherein the at least one memory and the computer program code are configured to, with the at least one processor, cause the apparatus to perform selecting, among a set of wireless devices associated with a radio access network device, the first wireless device to operate as a relay or sidelink node for extending cell coverage of the network device.

14. The apparatus of claim 13, wherein the at least one memory and the computer program code are configured to, with the at least one processor, cause the apparatus to perform selecting the first device on the basis of at least one of:
- signal quality measurement information associated with the first device,
- position information of the first device,
- cell coverage information, or
- an indication or a request of being a candidate for connectivity extension received from the first device.

15. The apparatus of claim 10, wherein the at least one memory and the computer program code are configured to, with the at least one processor, cause the apparatus to perform:
- selecting a third device among a set of wireless devices to operate as a relay node for extending coverage of the network device, and
- defining a second beam sweeping configuration for the third wireless device, indicative of a beam sweeping range which is at least partly different than a beam sweeping range indicated with the beam sweeping configuration for the first device.

\* \* \* \* \*